United States Patent
Fricano et al.

(10) Patent No.: US 10,346,273 B2
(45) Date of Patent: Jul. 9, 2019

(54) AUTOMATED ANALOG FAULT INJECTION

(71) Applicant: Analog Devices Global Unlimited Company, Hamilton (BM)

(72) Inventors: Courtney E. Fricano, Wilmington, NC (US); Paul P. Wright, Dooradoyle (IE); David Brownell, Sherborn, MA (US)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 0 days.

(21) Appl. No.: 15/713,090

(22) Filed: Sep. 22, 2017

(65) Prior Publication Data
US 2019/0095298 A1 Mar. 28, 2019

(51) Int. Cl.
*G06F 11/22* (2006.01)
*G01R 31/28* (2006.01)
*G01R 31/3183* (2006.01)
*G06F 17/50* (2006.01)

(52) U.S. Cl.
CPC ...... *G06F 11/2252* (2013.01); *G01R 31/2846* (2013.01); *G01R 31/31835* (2013.01); *G06F 17/5022* (2013.01); *G06F 2217/70* (2013.01)

(58) Field of Classification Search
CPC ............ G06F 17/5022; G01R 31/2846; G01R 31/31835
USPC ........................................................ 716/136
See application file for complete search history.

(56) References Cited

U.S. PATENT DOCUMENTS

| | | | |
|---|---|---|---|
| 5,184,308 A * | 2/1993 | Nagai | G01R 31/31835 703/15 |
| 6,704,894 B1 * | 3/2004 | Kania | G01R 31/31835 714/25 |
| 6,714,035 B2 * | 3/2004 | Witte | G01R 31/307 324/754.23 |
| 6,845,479 B2 * | 1/2005 | Illman | G01R 31/31835 714/739 |
| 7,937,679 B2 | 5/2011 | Mariani | |
| 8,683,400 B1 * | 3/2014 | O'Riordan et al. | G06F 17/5022 703/13 |
| 8,959,468 B2 * | 2/2015 | Katoch et al. | G06F 17/5036 716/112 |
| 9,026,963 B1 * | 5/2015 | O'Riordan et al. | G06F 17/5022 703/13 |
| 9,372,946 B2 * | 6/2016 | Sunter | G06F 17/5009 |
| 9,542,641 B2 * | 1/2017 | Abdi et al. | B82Y 10/00 |
| 9,984,119 B2 * | 5/2018 | Luo et al. | G06F 17/30451 |
| 2008/0276206 A1 | 11/2008 | Mariani | |

OTHER PUBLICATIONS

John E. Jagodnik et al., *Systematic Fault Simulation in an Analog Circuit Simulator*, IEEE Transactions on Circuits and Systems, vol. CAS-26, No. 7, Jul. 1979, 6 pages.

(Continued)

*Primary Examiner* — Sun J Lin
(74) *Attorney, Agent, or Firm* — Patent Capital Group

(57) ABSTRACT

Systems and methods are provided for an automated analog fault injection including creating a list of fault models for injection to an analog circuit, adding a first fault placeholder to the analog circuit, running fault simulations by replacing the first fault placeholder with a first fault model from the list of fault models, and determining whether the first fault model is detected.

20 Claims, 14 Drawing Sheets

(56) References Cited

OTHER PUBLICATIONS

Kevin Klein Osowski et al., *The SEASONing Tool: A Spice Engine for Adding Soft-errors on Netlists*, University of Minnesota Laboraty for Advanced Research in Computing Technology and Compilers Technical Report No. ARTiC 05-09, May 2005, 12 pages.

R. Leveugle et al., *Early SEU Fault Injection in Digital, Analog and Mixed Signal Circuits: a Global Flow*, Proceedings of the Design, Automation and Test in Europe Conference and Exhibition 1530-1591/04 © 2004, IEEE, 6 pages.

Stephen Spinks et al., *Antics Analogue Fault Simulation Software*, The Institution of Electrical Engineers, London, UK, © 1997, 5 pages.

Haissam Ziade et al., *A Survey on Fault Injection Technique*, The International Arab Journal of Information Technology, vol. 1, No. 2, Jul. 2004, 16 pages.

Stephen Sunter, *Part 1: Analog Fault Simulation Challenges and Solutions*, www.mentor.com, © 2016, 10 pages.

Enrico Fraccaroli et al., *Analog Fault Testing Through Abstraction*, IEEE.org, IEEE Xplore Digital Library, IEEE-SA, IEEE Spectrum, May 15, 2017, 3 pages.

A. Ammari et al., *SET Fault Injection Methods in Analog Circuits: Case Study*, TIMA, http://tima.fr/alfa-nicron/documents/8set_fault.pdf, 2007, 6 pages.

Karim Arabi et al., *Short Papers—Testing Analog and Mixed-Signal Integrated Circuits Using Oscillation-Test Method*, IEEE Transaction on Computer-Aided Design of Integrated Circuits and Systems, vol. 16, No. 7, Jul. 1997, 9 pages.

EP Search Report issued in EP Patent Application Serial No. 18194101.4 dated Feb. 12, 2019, 13 pages.

Anonymous: *Lecture 3—Fault Simulation and Fault Injection*, Aug. 29, 2017, retrieved from the Internet: http://www.inf.ufrgs.br/-fglima/projecto/aula3t.pdf, 34 pages.

Xu et al., *Mutant Generation for Analog Circuit Designs*, 978-1-4799-3279-5/14 © 2014 IEEE, 5 pages.

\* cited by examiner

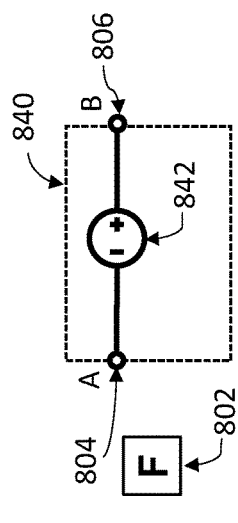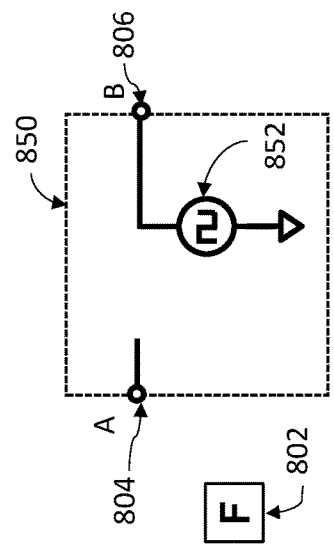

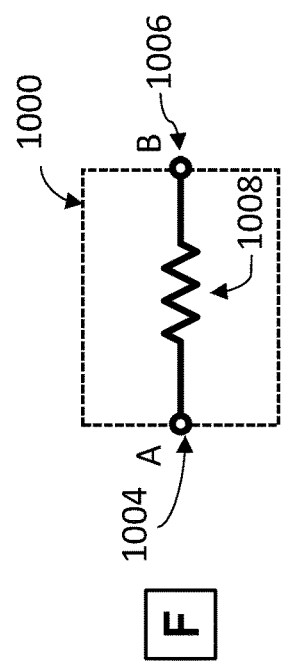
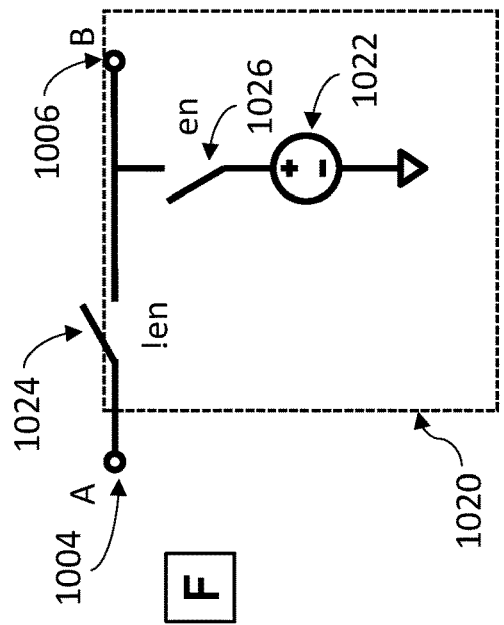
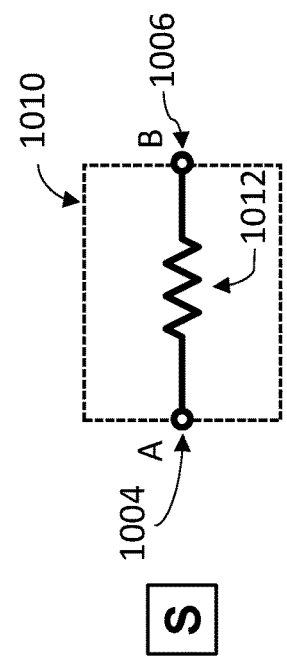
FIGURE 10A
FIGURE 10C
FIGURE 10B

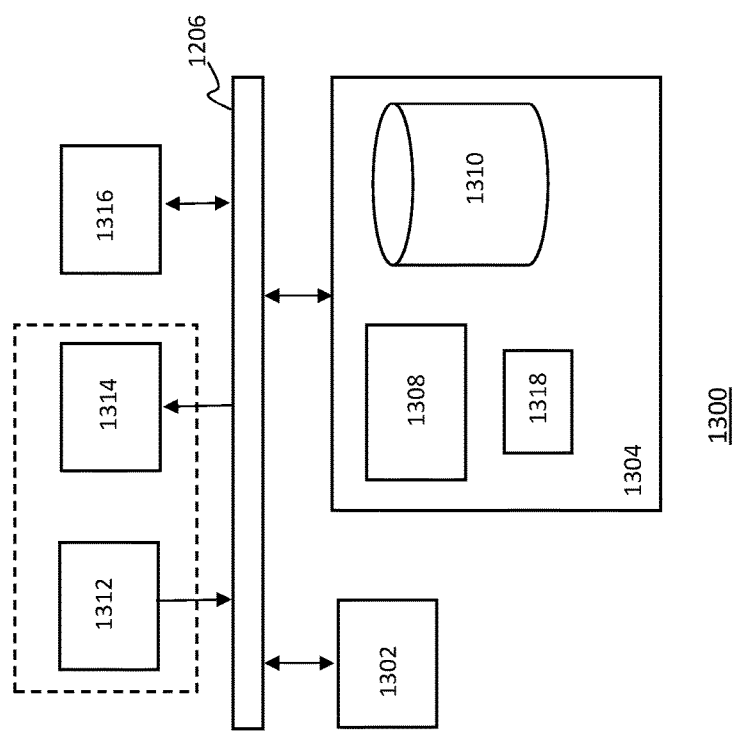

AUTOMATED ANALOG FAULT INJECTION

TECHNICAL FIELD OF THE DISCLOSURE

The present invention relates to the field of fault injection in analog circuits.

BACKGROUND

Functional safety is part of the safety of a system, and depends on how the system operates in response to its inputs. Functional safety for circuits depends on the response of the various circuit components to an input. Testing can be used to check the response of a system to unexpected errors. For functional safety qualification of a circuit, fault injection is used to model a fault that may occur in the actual chip, and then evaluate the circuit response (for example, by flagging an error and/or entering a safe state). For testbench qualification of a circuit, fault injection is used to model a bug in the design to see if the testbench detects an error. If the testbench does not flag an error, then there is a hole in the verification test strategy.

Faults injection is commonly done on digital circuits, in which a fault is easily measured as an incorrect binary value (e.g., a one or a zero). Fault injection in analog circuits is more difficult. In particular, analog fault injection is very slow. Furthermore, it can be difficult to determine what constitutes a fault in an analog fault, since analog outputs can have many possible values, and analog faults can result in varied circuit behavior. Traditional analog fault injection methods require a large amount of manual work and are very circuit-specific. There are some post-silicon analog fault injection methods, but these methods limit the types of faults that can be injected and delay qualification results until after tapeout. Analog fault injection is therefore typically performed on a limited case-by-case basis.

SUMMARY OF THE DISCLOSURE

Automated and customizable analog fault injection systems and methods are disclosed. In particular, a method for running fault injection in an analog circuit to meet functional safety product requirements includes determining a list of faults to consider, creating a fault netlist for the circuit, running fault simulations, and reporting detection results. Also disclosed is a tool to automate the fault injection flow for any analog design block.

According to some implementations, a method for automated analog fault injection includes creating a list of fault models for injection to an analog circuit, adding a first fault placeholder to the analog circuit, running fault simulations by replacing the first fault placeholder with a first fault model from the list of fault models, and determining whether the first fault model is detected. In various examples, creating a list of fault models includes specifying custom fault types. In some examples, the first fault placeholder is a voltage source having zero volts.

In some implementations, the method further comprises generating a report of detection results. According to some implementations, the method further comprises creating a list of fault locations, and adding a second fault placeholder to each fault location on the list of fault locations. In some implementations, the method further comprises adding a short fault placeholder to the analog circuit, wherein the short fault placeholders are fault shorts. In various implementations, the method further comprises adding a plurality of second fault placeholders at subcircuit ports.

According to some implementations, a system for automated analog fault injection comprises a list of fault models for injection to an analog circuit, a plurality of fault placeholders for adding to the analog circuit, and a processor configured to run fault simulations by replacing ones of the plurality of fault placeholders with a first fault model from the list of fault models, wherein the processor is further configured to determine whether the first fault model is detected. In some examples, the list of fault models includes custom fault types. In some examples, the plurality of fault placeholders are each voltage sources having zero volts In some implementations, the processor is further configured to generate a report of detection results. In some implementations, the processor is further configured to create a list of fault locations, and fault placeholders of the plurality of fault placeholders are added to each fault location on the list of fault locations. According to some implementations, the system further comprises a short fault placeholder for adding to the analog circuit, wherein the short fault placeholder is an open circuit.

According to some implementations, one or more non-transitory computer-readable media are provided, with instructions stored thereon, the instructions when executed on a machine, cause the machine to create a list of fault models for injection to an analog circuit, add a first fault placeholder to the analog circuit, run fault simulations by replacing the first fault placeholder with a first fault model from the list of fault models, and determine whether the first fault model is detected. In some examples, creating a list of fault models includes specifying custom fault types. In some examples, the first fault placeholder is a voltage source having zero volts.

In some implementations, the instructions, when executed on the machine, cause the machine to generate a report of detection results. In some implementations, the instructions, when executed on the machine, cause the machine to create a list of fault locations, and add a second fault placeholder to each fault location on the list of fault locations. In some implementations, the instructions, when executed on the machine, cause the machine to add a short fault placeholder to the analog circuit, wherein the short fault placeholder is a fault short. In some implementations, the instructions, when executed on the machine, cause the machine to add a plurality of second fault placeholders at subcircuit ports.

BRIEF DESCRIPTION OF THE DRAWING

To provide a more complete understanding of the present disclosure and features and advantages thereof, reference is made to the following description, taken in conjunction with the accompanying figures, wherein like reference numerals represent like parts, in which:

FIGS. 8A-8F are diagrams illustrating fault models, according to some embodiments of the disclosure;

FIGS. 10A-10C are diagrams illustrating open, short, and transient fault models, according to some embodiments of the disclosure;

FIG. 13 depicts a block diagram illustrating an exemplary data processing system that may be used in a computing system for analog fault injection, according to some embodiments of the disclosure.

DESCRIPTION OF EXAMPLE EMBODIMENTS OF THE DISCLOSURE

Figure 1:
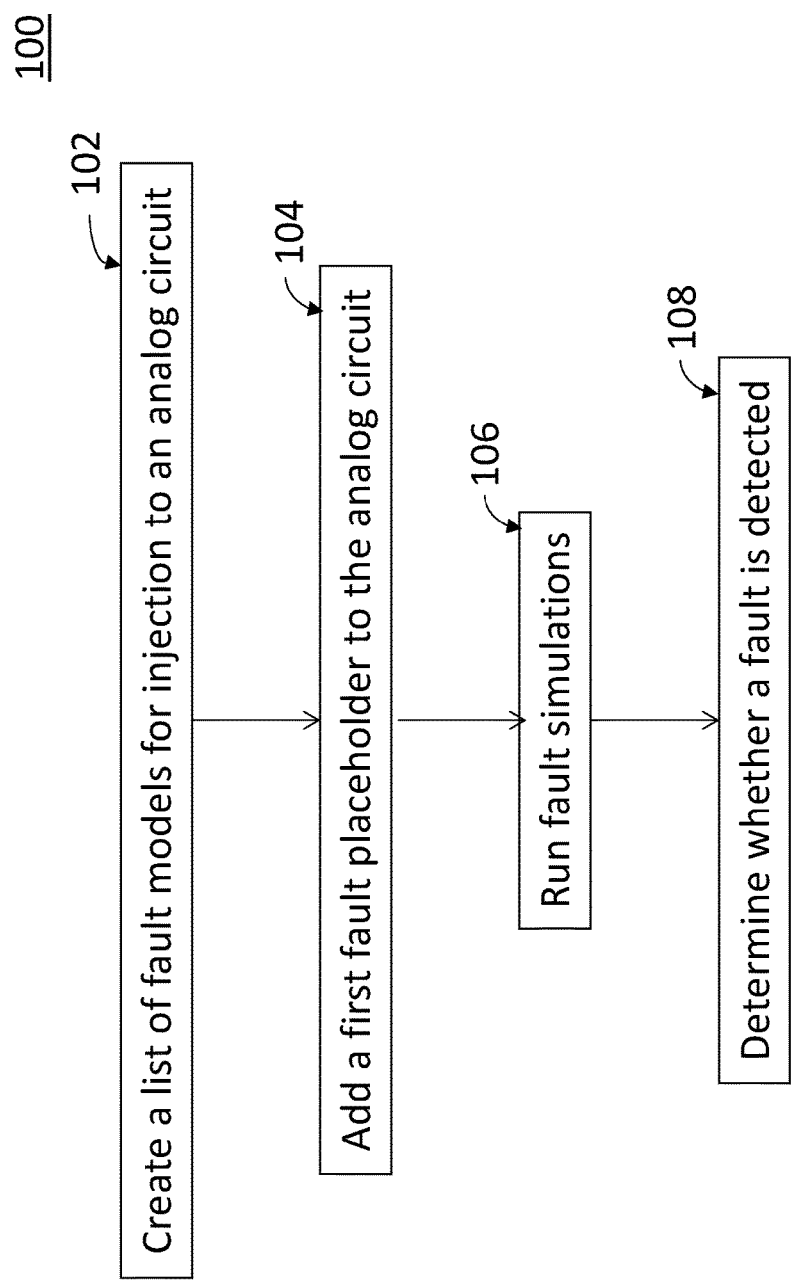
FIG. 1 is a flow chart illustrating a method for automated analog fault detection, according to some embodiments of the disclosure.

Industry-standard functional safety requirements for circuits include fault injection qualification. Fault injection qualification is a well-understood task in the digital domain, but is much more complex for analog circuits. Analog fault injection presents several new challenges when compared with digital fault injection. First, there is no standardized model for a circuit fault. In digital designs, any type of manufacturing fault will eventually result in a node stuck at logic high or logic low (1/0) due to the nature of CMOS logic. Analog faults do not have an equivalent model: faults can result in varied circuit behavior depending on the nature of the design and the fault itself. Additionally, there is no standardized fault detection mechanism for analog circuits. Furthermore, existing analog fault injection requires a large amount of manual work. In particular, for conventional analog fault injection, for each analog circuit to be tested, a custom testbench is created to inject faults. Systems and methods discussed herein describe a methodology for executing fault injection qualification on an analog circuit. Additionally, a tool to automate the qualification process is disclosed.

There are several different applications for analog fault injection, including functional safety and testbench qualification. Functional safety is part of the safety of a system, and depends on how the system operates in response to its inputs. Functional safety for circuits depends on the response of the various circuit components to an input. Testing can be used to check the response of a circuit to unexpected errors. In particular, by injecting known faults into a circuit, the response of the circuit to the faults can be observed. In general, a circuit's safety features should detect injected faults.

Another application for analog fault injection is testbench qualification, which allows for quantification of the quality of a design verification (DV) strategy. In particular, analog fault injection can be used to inject faults (bugs) in the design. Then, the system can be tested to see if the DV strategy detects the injected faults. If an injected fault is not detected by the DV strategy, this indicates a defect in the DV strategy. Once the DV defect is detected, it can be corrected.

Systems and methods for analog fault injection are provided to increase the efficiency of analog fault injection. In particular, a standardized framework for analog fault injection is provided, including a library of fault types, and systems and methods for automating fault simulation generation and result collection. A library of fault models is provided for each potential fault node in the circuit in order to simulate the effects of different fault behavior in the design.

Another challenge of analog fault injection is how to analyze the detection of injected faults. For digital faults, an injected fault is considered to be detected if it propagates an incorrect value to an output port. For analog circuits, a fault may not create a large change at an output port, so more subtle detection methods are needed. In some implementations, the detection mechanism for analog circuits can be unique for each circuit design. In one example, a user creates a self-checking verification testbench that prints a message to the simulation log file when the detection mechanism is triggered.

In some implementations, when the automated fault injection tool is configured, the user can specify a message or set of messages in the log file that indicate that a fault has been detected by the circuit. Similarly, the user can define log file messages that indicate that the verification testbench observed an unsafe condition, as defined by the design's functional safety limits. The automated tool can then use the detection and unsafe condition results to categorize the fault simulation for the functional safety analysis. By relying on the self-checking verification testbench to observe the detection result, the automated system remains flexible to be easily used with any type detection mechanism used by the circuit.

In other implementations, when the automated fault injection tool is configured, a message or set of messages are automatically included in the log file to indicate that a fault has been detected by the circuit. Similarly, the system can include pre-loaded log file messages to indicate that the verification testbench observed an unsafe condition as defined by the design's functional safety limits. The automated tool can then use the detection and unsafe condition results to categorize the fault simulation for the functional safety analysis. By relying on the self-checking verification testbench to determine the detection result, the automated system is flexible and can be used with any type detection mechanism used by the circuit.

In another example, the non-faulty simulation output values are recorded and compared to the faulty simulation values. The tolerance value for a test simulation value to be labeled as faulty (as compared to the non-faulty simulation output value) can be predetermined, or it can be set by a user. Setting a tolerance value for labeling a test simulation value as faulty eliminates the self-checking testbench. However, in some examples, setting a tolerance value for labeling a test simulation value as faulty provides less flexibility to model complex detection mechanisms.

FIG. 1 shows a method 100 for analog fault injection, according to one embodiment of the disclosure. The method 100 includes creating a list of fault models for injection to an analog circuit (step 102), adding a first fault placeholder to the analog circuit (step 104), running fault simulations (step 106), and determining whether a fault is detected (step 108). The method may further include reporting detection results.

In some implementations, the method 100 includes creating a list of fault locations. Creating the list of fault models (step 102) may include creating a list of fault models to inject at each location in the list of fault locations. In some examples, the list defaults to injecting each of the fault models at each location in the list of fault locations. In other examples, the list of fault models to inject at each location is narrowed down to reduce the number of simulations. In various examples, the fault selection process is based on one or more of a functional safety Fault Tree Analysis (FTA) and Failure Modes, Effects, and Diagnostic Analysis (FMEDA) results. In other examples, the fault selection process is based on other factors and/or analyses. In some implementations, a list of potential fault locations is auto-generated. In some examples, the list includes all potential fault locations.

The method 100 may include creating a fault netlist for the circuit, including fault placeholders. A circuit netlist includes the electronic components in the circuit and the nodes the components are connected to. The fault netlist is a copy of the circuit netlist with placeholders for potential faults. The placeholders for potential faults are added at locations between connections. According to some implementations, placeholders are added at hierarchical boundaries in the circuit netlist. In one example, placeholders are added to the input/output ports of the subcircuits of a circuit. In some implementations, short faults are added on internal nodes. In some examples, selected nodes are shorted to VDD or VSS. In some implementations, the method 100 further includes initializing a fault database, and creating a list of fault simulations to run.

In some implementations, for fault injection applications, the analog fault injection system creates a netlist with fault placeholders at every subcircuit port. In various applications, a user can select the faults to inject for simulations. In some implementations, the specific subcircuit port nodes to inject faults to and the list of fault models to use is automated. In other implementations, one or more of the specific subcircuit port nodes to inject faults to and the list of fault models to use is specified by a user. For fault simulations, a fault placeholder is replaced with a selected fault model.

In one implementation, the fault library includes one or more faults from the following list of fault models:
  stuck-at zero—connect node to negative supply of appropriate voltage domain
  stuck-at one—connect node to positive supply of appropriate voltage domain
  open—disconnect driving node
  short—connect node to another node in the circuit
  transient fault—connect to positive or negative supply voltage for a short amount of time
  drift—connect node to voltage that changes over time
  oscillation—connect node to oscillating voltage
  parametric—change component parameter value by certain percentage The library can also be extended to implement a design-specific custom fault model. In particular, custom fault types can be added to the library.

Running fault simulations (step 106) includes running a simulation for each selected fault by replacing a fault placeholder with a fault model from the list of fault models. At step 108, the method includes determining whether a fault is detected. Thus, for example, when a first fault placeholder is replaced with a first fault model, a detection result is output. In some implementations, the detection result is stored in a results database. The results database is updated with each output detection result.

In some implementations, the method 100 further includes creating a fault qualification report. In one example, during the simulation setup, a placeholder fault instance is replaced with a model from the fault library, and the detection result is recorded in a results database. Reporting detection results includes, once all simulations complete, parsing the result database and determining which faults were undetected. A report is created with the detection results and the functional safety safe failure fraction (SFF) for user analysis.

A system is provided for automating the analog fault injection method for any analog block. In one implementation, the automating system uses a simulator and a verification framework. In one example, the simulator is a SPICE (Simulation Program with Integrated Circuit) simulator. In one example, the verification framework is a simulation launcher. In some implementations, the system is used to inject faults in a transistor-level netlist. The transistor level netlist describes the circuit as designed. However, since transistor-level simulations can be slow, a behavioral model for the circuits can be developed to model most (but not all) of the functionality of the transistor-level circuit at a higher level of abstraction. Running a simulation on a behavioral model improves simulation time. Thus, in some implementations, the tool is used to inject faults in a behavioral model netlist.

In some examples, the system is used to run a co-simulation with a Verilog simulator to enable fault injection in an analog block within a design that has digital sub-blocks. Verilog is a hardware description language (HDL) and Verilog code maps to hardware gates. In other examples, the system is used to run a co-simulation in a digital design that has analog sub-blocks. In one example, an analog sub-block is targeted for fault injection. In either type of co-simulation, the functional safety detection mechanism may exist outside of the block being tested. Thus, a top-level simulation as described herein shows the full result of the fault injection.

Figure 2:
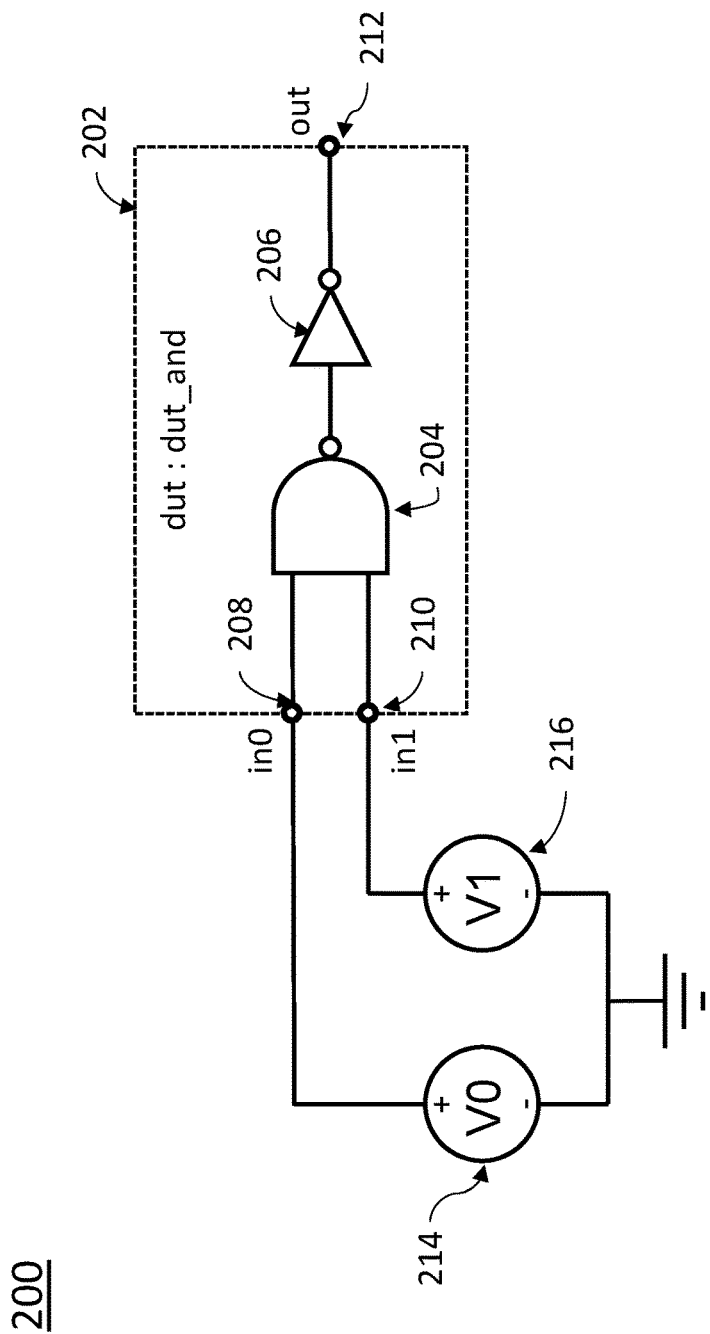
FIG. 2 is a diagram showing an example testbench with an AND gate, according to some embodiments of the disclosure.

FIG. 2 is a diagram 200 showing an example testbench 202 having an AND gate including NAND gate 204 and NOT gate 206, according to some embodiments of the disclosure. The testbench 202 has a first input 208 and a second input 210 which are both input to the NAND gate 204. The output from the NAND gate 204 is input to a NOT gate 206, and the output from the NOT gate 206 is the output 212 from the testbench 202. First 214 and second 216 voltages are connected to the first 208 and second 210 inputs. In one example, in the testbench 202, an error is flagged if the output 212 is not equal to the first input 208 AND the second input 210 (out !=in0 && in1). In another example, in the example testbench 202, an unsafe error is flagged if the voltage at the output 212 is greater than three (3) volts (v(out)>3V).

Figure 3:
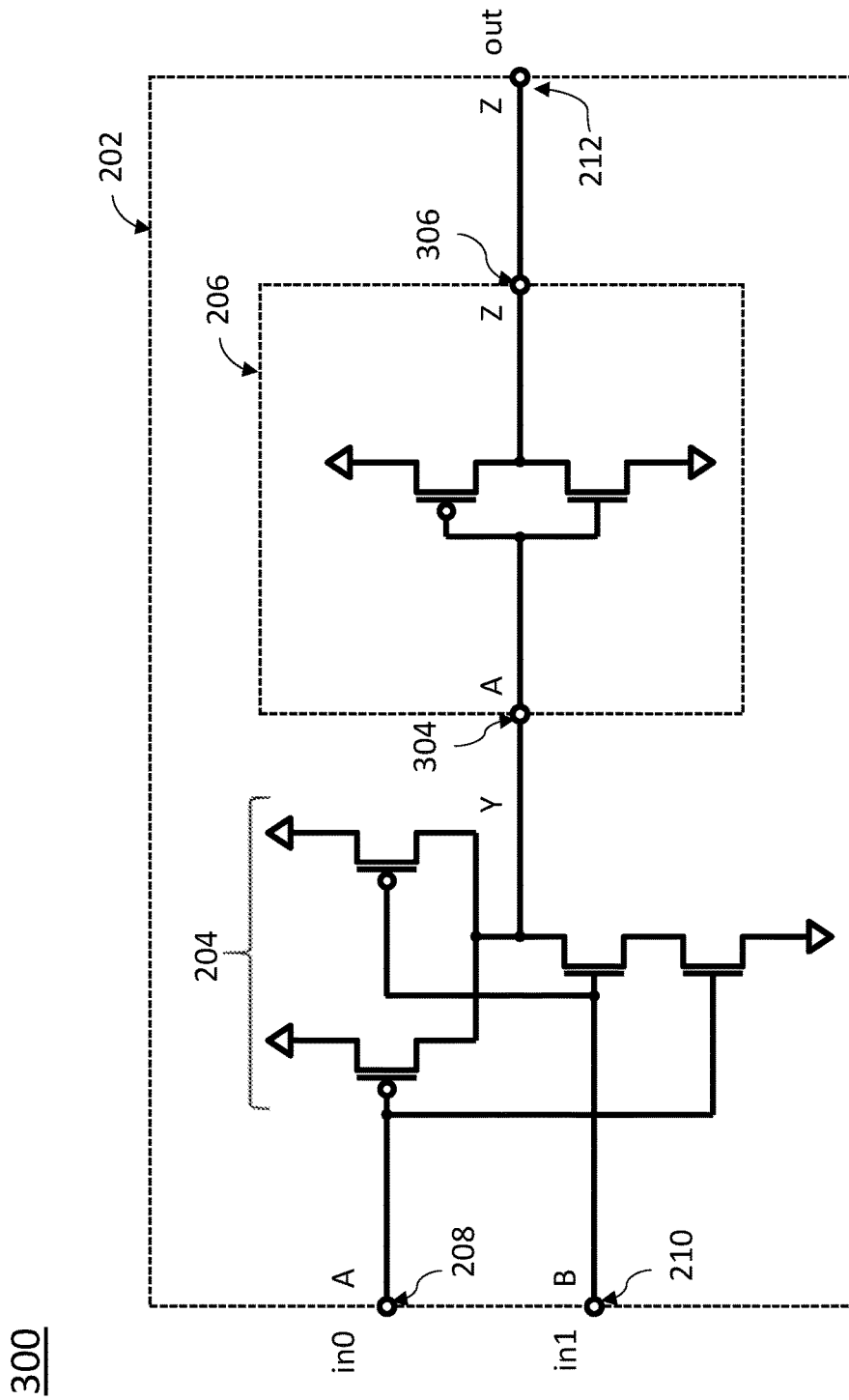
FIG. 3 is a diagram illustrating an analog circuit of the AND gate in FIG. 2.

FIG. 3 is a diagram 300 illustrating the transistor-level circuit components of the testbench 202 shown in FIG. 2. As shown in diagram 300, the testbench 202 includes first 208 and second 210 inputs, a NAND gate 204, a NOT gate 206, and an output 212. For fault injection of the analog circuit shown in FIG. 3, fault injection placeholders are added to subcircuit ports of the analog circuit.

Figure 4:
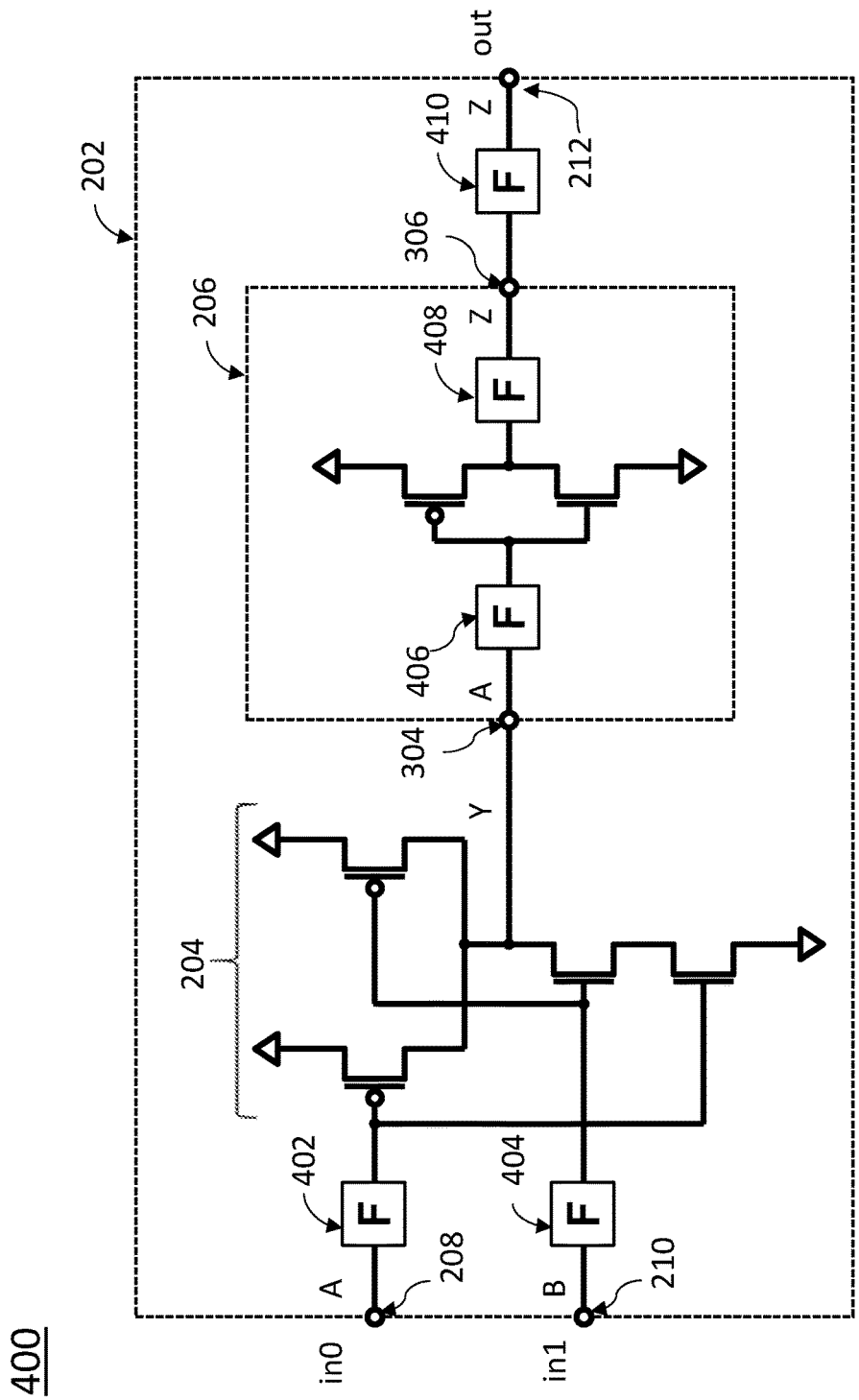
FIG. 4 is a diagram illustrating an analog circuit including fault injection placeholders, according to some embodiments of the disclosure.

FIG. 4 is a diagram 400 illustrating the analog circuit of FIG. 3 including fault injection placeholders 402, 404, 406, 408, 410, and 412, according to some embodiments of the disclosure. In particular, fault injection placeholders 402, 404, 406, 408, 410, and 412 are added to the subcircuit ports of the analog circuit. The first fault injection placeholder 402 is placed between the first input 408 and the NAND gate 204. The second fault injection placeholder 404 placed between the second input 410 and the NAND gate 204. The third fault injection placeholder 406 is placed between the NAND gate 204 and the NOT gate 206. The fourth fault injection placeholder 408 is placed between the NOT gate

206 and a NOT gate output 306. The fifth fault injection placeholder 410 is placed between the NOT gate output 306 and the circuit output 212. Thus, in the example shown in FIG. 4, five subcircuit fault placeholders are added.

In the example circuit shown in FIG. 4, there is no difference between the fourth placeholder 408 and the fifth placeholder 410, since both nodes have a fan-in and fan-out of 1 (there is a point-to-point connection between the fourth 408 and fifth 410 placeholders). Thus, the fourth 408 and fifth 410 fault injection placeholders are redundant. However, the automated system adds placeholders automatically as described above, which can result in redundant placeholders as shown in FIG. 4.

In another example, in a more complex circuit, a node such as the node 306 in FIG. 4 combines with other circuitry before attaching to an output node, such as the output node 212 in FIG. 4. In this more complex circuit example, a fifth placeholder, such as the fifth placeholder 410, has another cone of logic feeding into it, differentiating it from a fourth placeholder, such as the fourth placeholder 408.

During a fault simulation, a fault placeholder 402, 404, 406, 408, 410 is replaced with a selected fault model. In some implementations, custom switches specify a fault model to use. According to some implementations, the analog fault injection system creates a list of fault simulations to run. In one example, the list of fault simulations is a regression file.

Figure 5:
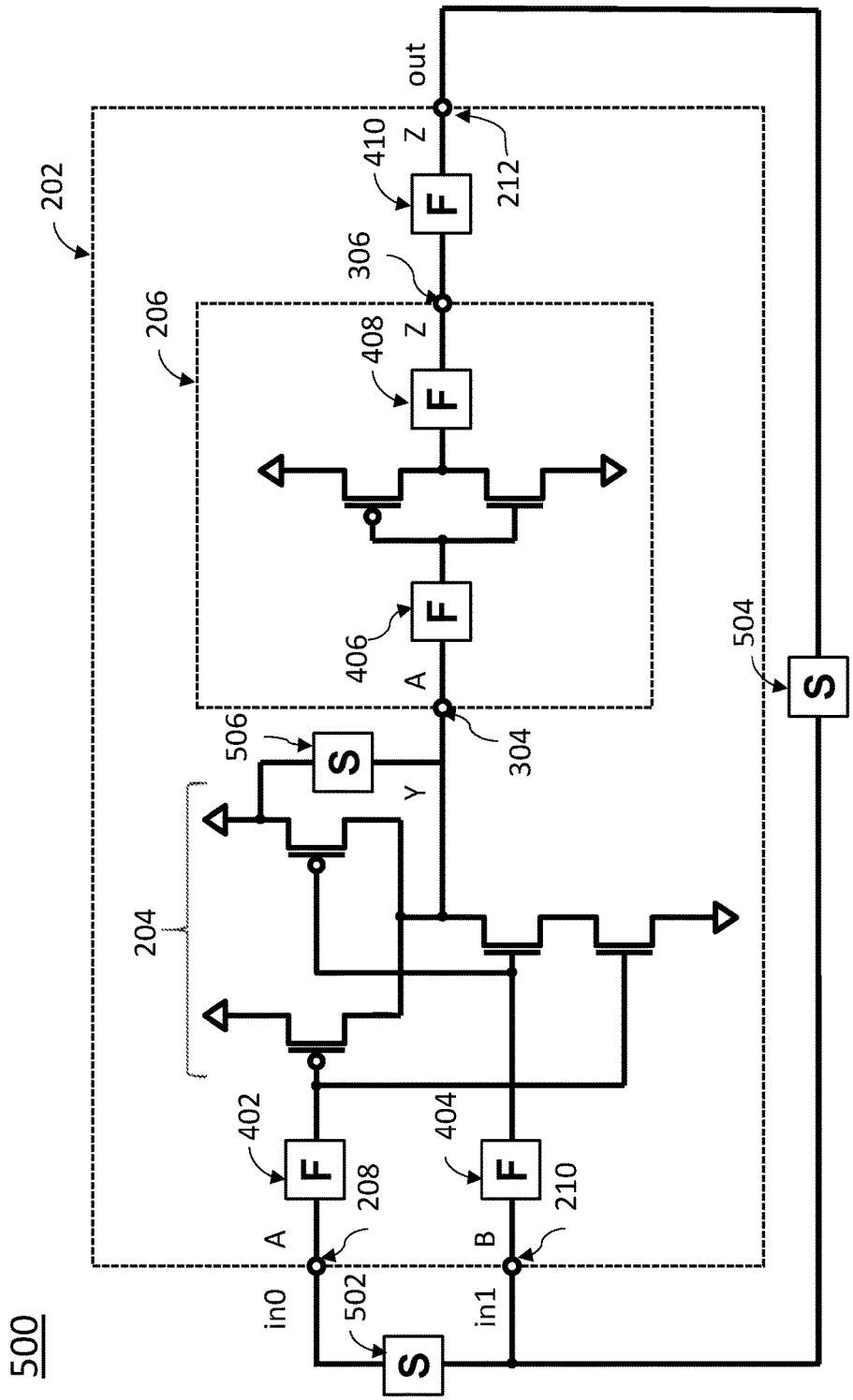
FIG. 5 is a diagram illustrating an analog circuit including short fault placeholders, according to some embodiments of the disclosure.

FIG. 5 is a diagram 500 illustrating the analog circuit of FIG. 4 including short fault placeholders 502, 504, and 506, according to some embodiments of the disclosure. The first 502, second 504, and third 506 short fault placeholders are added between user-specified nodes. The short fault placeholders are fault models which are open circuits, as described in greater detail with respect to FIG. 6B. The first short fault placeholder 502 is positioned between the first 208 and second 210 inputs. The second short fault placeholder 504 is positioned between the output 212 and the inputs 208, 210. The third short fault placeholder is positioned between a VDD of the NAND gate 204 and the node 304.

Figure 6B:
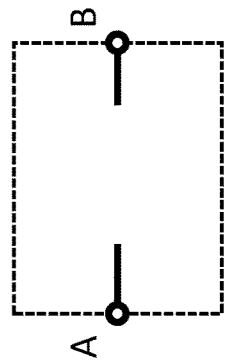
FIGS. 6A and 6B are diagrams illustrating fault placeholders, according to some embodiments of the disclosure.
Figure 6A:
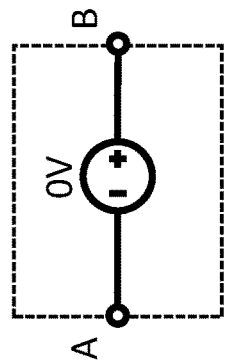

FIG. 6A is a diagram 600 illustrating a fault placeholder, and FIG. 6B is a diagram 650 illustrating a short fault placeholder, according to some embodiments of the disclosure. As shown in FIG. 6A, a fault placeholder is a voltage source having zero volts (which default to a wire). Thus, in some implementations, when a fault placeholder is added to a circuit for a fault injection application, a zero-volt voltage source is added to the circuit. In other implementations, when a fault placeholder is added to a circuit for a fault injection application, a zero-ohm resistor is added to the circuit. In various implementations, the simulator determines for each placeholder whether to add a zero-vault voltage source or a zero-ohm resistor depending on the circuit structure. As shown in FIG. 6B, a short fault placeholder is a fault short, which defaults to an open circuit. When a short fault placeholder is added to a circuit for a fault injection application, an open circuit connection is added to the circuit.

Figure 7:
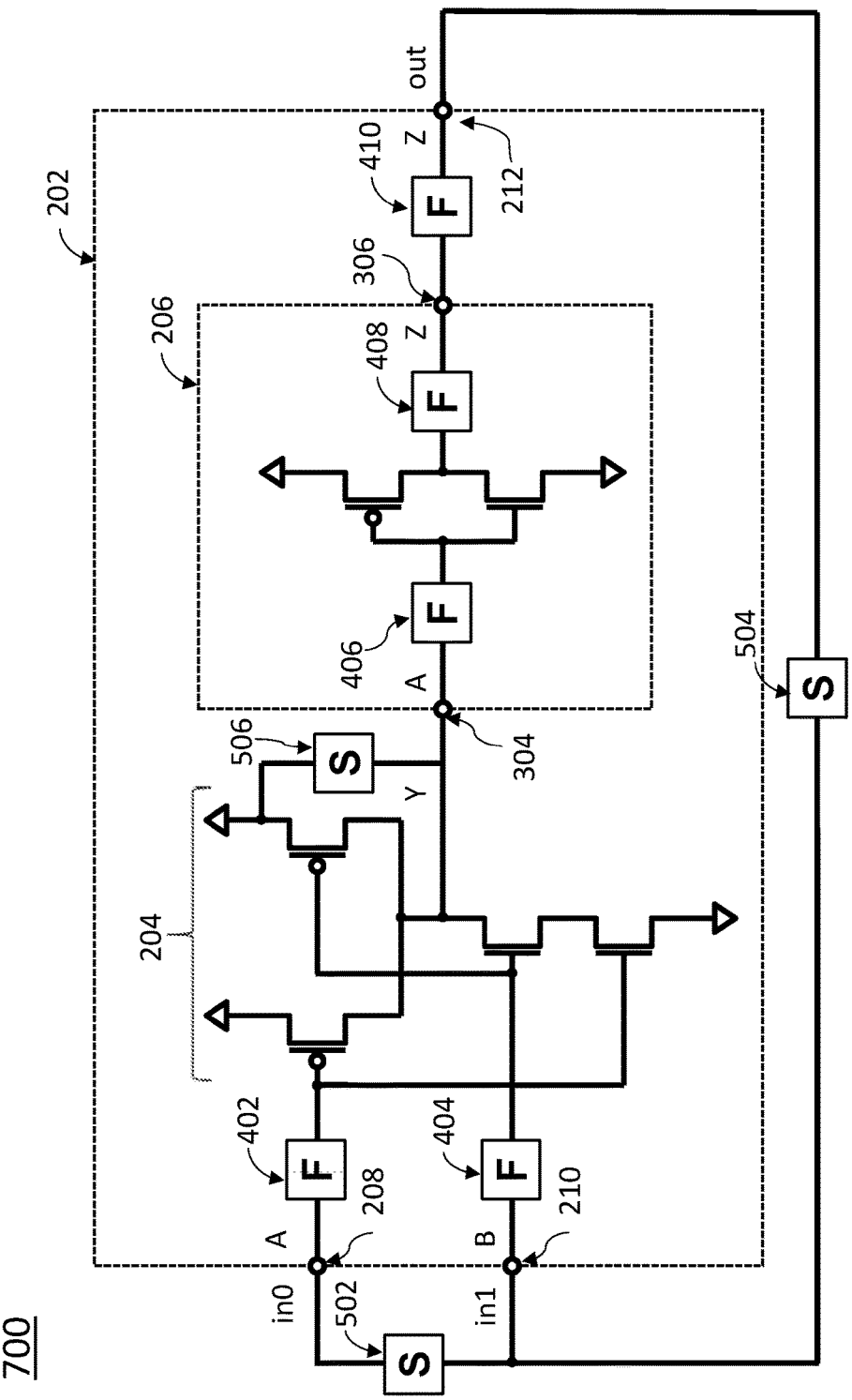
FIG. 7 is a diagram illustrating analog circuit fault injection, according to some embodiments of the disclosure.

FIG. 7 is a diagram 700 illustrating analog circuit fault injection, according to some embodiments of the disclosure. In particular, in FIG. 7, the first fault placeholder 402 is replaced with an actual fault. In various examples, a fault can be an open circuit, a short circuit, a negative supply input, a positive supply input, and a transient fault. Other faults, including faults discussed in the specification, can be injected in to the circuit 202 during a fault injection simulation. In one example, a parametric fault is used, where a parametric fault is a change in circuit component value by more than 10%. In some examples, the circuit component is one of a resistor, a capacitor, and a transistor.

FIGS. 8A-8F are diagrams illustrating fault models, according to some embodiments of the disclosure. In FIGS. 8A-8F, a fault placeholder 802 can be replaced with the illustrated fault models 800, 810, 820, 830, 840, 850. FIGS. 8A-8F each show a fault model 800, 810, 820, 830, 840, 850, and each of the fault models 800, 810, 820, 830, 840, 850 includes a first node 804 and a second node 806. The fault models 800, 810, 820, 830, 840, 850 are faults that are inserted between the first node 804 and the second node 806.

Figure 8A:
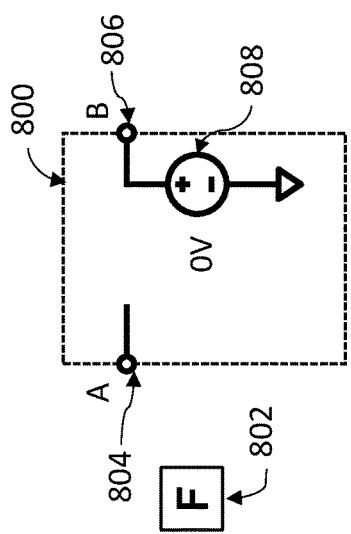

FIG. 8A shows the first fault model 800 for an input stuck low. In FIG. 8A, the first node 804 is the input and the second node 806 is the output. In the first fault model 800, the first node 804 has an open connection, and the input to the second node 806 is stuck off, at zero volts. In the first fault model 800, the connection to the second node 806 is a negative supply voltage source 808. In various implementations, the negative supply voltage source 808 can be zero voltage or a voltage source with a negative voltage value. In some implementations, the voltage source 808 is a VSS source. In some examples, the first fault model 800 models an input stuck at zero.

Figure 8B:
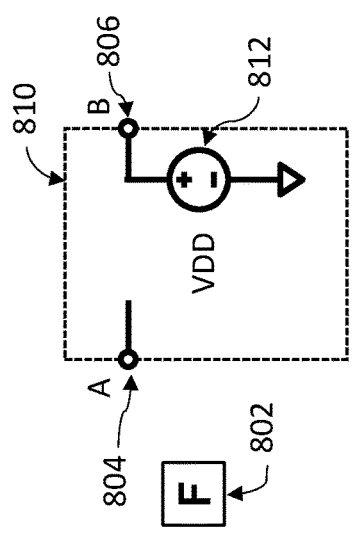

FIG. 8B shows the second fault model 810 for an input stuck high. In FIG. 8B, the first node 804 is the input and the second node 806 is the output. In the second fault model 810, the first node 804 has an open connection, and the input to the second node 806 stuck on, with a positive voltage. In the second fault model 810, the connection to the second node 806 is a positive voltage source 812. In some examples, the second fault model 810 models an input stuck at one. In various implementations, the positive voltage source 812 can be a one-volt voltage source, a 1.8 volt voltage source, a 3.3 volt voltage source, or a voltage source with a different positive voltage value.

Figure 8C:
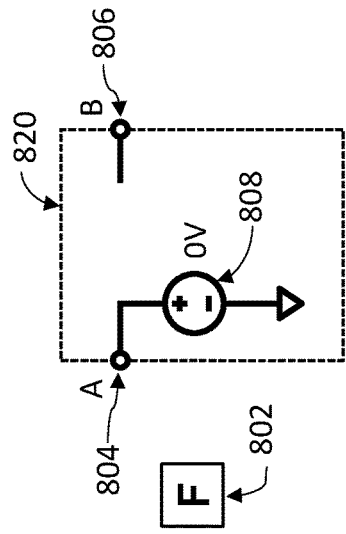

FIG. 8C shows the third fault model 820 for an output stuck at zero. In FIG. 8C, the second node 806 is the input and the first node 804 is the output. In the third fault model 820, the second node 806 has an open connection, and the input to the first node 804 is stuck off, at zero volts. In the third fault model 820, the connection at the input to the first node 804 is a negative supply voltage source 808. In various implementations, the negative supply voltage source 808 can be zero-voltage voltage or a voltage source with a negative voltage value. In some implementations, the voltage source 808 is a VSS source. In some examples, the third fault model 820 models an output stuck at zero.

Figure 8D:
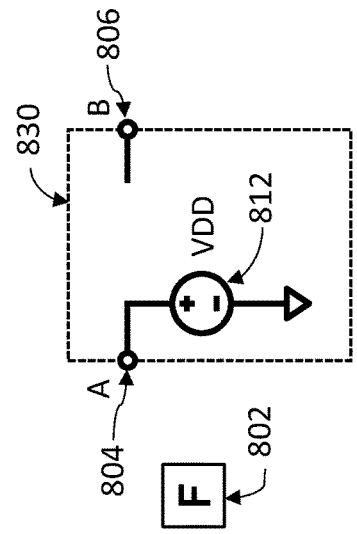

FIG. 8D shows the fourth fault model 830 for an output stuck at one. In FIG. 8D, the second node 806 is the input and the first node 804 is the output. In the fourth fault model 830, the connection at the input to the first node 804 is stuck on, with a positive voltage, and the second node 806 has an open connection. In the fourth fault model 830, the connection at the input to the first node 804 is a positive voltage source 812. In various implementations, the positive voltage source 812 can be a one-volt voltage source, or a voltage source with a different positive voltage value.

FIG. 8E shows the fifth fault model 840, which shows a drift fault. In FIG. 8E, the first node 804 is the input and the second node 806 is the output. In the fifth fault model 840, there is a voltage source 842 between the first 804 and second 806 nodes. In one example, the voltage source 842 has a drift voltage that is slowly increasing. In another example, the voltage source 842 has a drift voltage that is slowly decreasing. The drift voltage is added to the original signal voltage to simulate a signal slowly moving away from its ideal value.

FIG. 8F shows the sixth fault model 850, which shows an oscillation fault. In FIG. 8F, the first node 804 is the input and the second node 806 is the output. In the sixth fault model 850, there is a periodic voltage source 852 between the first 804 and second 806 nodes. The periodic voltage source 852 has a voltage that oscillates between VDD and VSS. Thus, the output node 806 alternates between stuck-at-0 and stuck-at-1 states. In various implementations, the voltage source 852 can any type of voltage source. In one example, the voltage source 852 is a sine wave voltage source. In another example, the voltage source 852 is a triangle wave voltage source.

Another type of fault model is a parametric fault. Instead of replacing a placeholder as shown for the fault models 800, 810, 820, 830, 840, 850, for a parametric fault model an existing circuit component parameter is selected, and the amount that the parameter value will be altered is specified. In one example, a resistor is selected, and the resistor value is increased. In one example, the resistor value is increased by 10%. In another example, a transistor is selected, and the transistor value is decreased. In one example, the transistor value is halved. In various implementations, a parametric fault model is used to change any parameter defined in the simulator model for the component.

Figure 9:
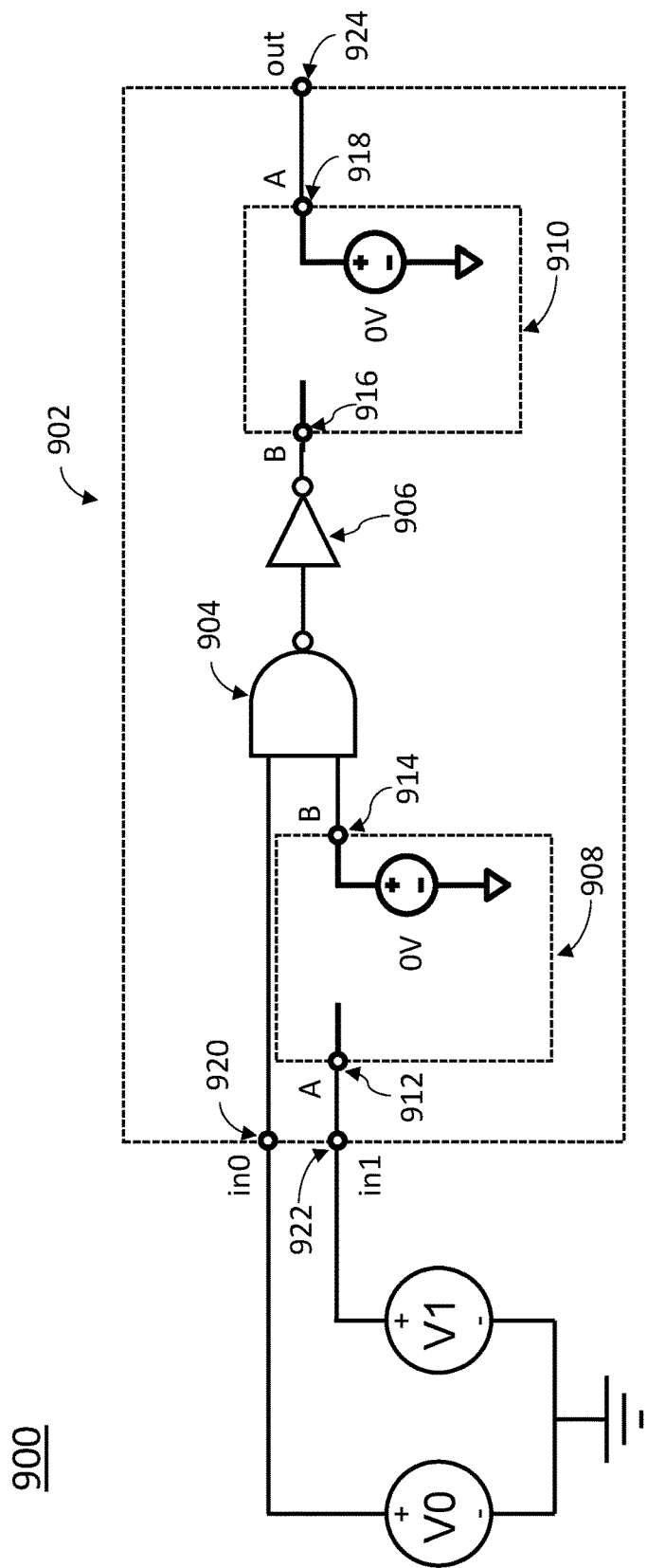
FIG. 9 is a diagram illustrating an analog circuit with input and output fault models, according to some embodiments of the disclosure.

FIG. 9 is a diagram illustrating an analog circuit 900 with an input fault model 908 and an output fault model 910, according to some embodiments of the disclosure. According to some implementations, only one of the input 908 and output 910 fault models is enabled at a time. The analog circuit 900 includes first 920 and second 922 inputs, a NAND gate 904, a NOT gate 906, and an output 920. The first 920 and second 922 inputs are input into the NAND gate 904, and the output from the NAND gate 904 is input to the NOT gate 906. The output 924 is the output from the NOT gate 906. The input fault model 908 is placed on the line between the second input 922 and the NAND gate 904. In the input fault model 908, a first node 912 has an open connection, and the input to a second node 914 is stuck off, at zero volts. Similarly, in the output fault model 910, a third node 916 has an open connection, and the input to a fourth node 918 is stuck off, at zero volts. As shown in FIG. 9, the input and output fault models are mirrored. The "stuck at" fault propagates downstream. The first node 912 and the fourth node 918 are both labeled as Port "A", and Port A connects to the subcircuit 902 boundary port. In some implementations, a user specifies the direction of the port.

According to various implementations, the automated fault injection system automatically inserts fault placeholders at subcircuit boundaries. When it inserts the placeholders, the system sets the location of A and B nodes. In various examples, the automated fault injection system considers circuit ports as input, output, and input/output ports. In some implementations, the system generates a placeholder with port A connected to the fault node.

In some examples, with reference to FIG. 9, the four types of faults from FIG. 8 are injected at each node. In other examples, a user specifies which type of fault to use at each node. For example, a user may specify that that input-type faults are injected on node 922 and output type faults are injected on node 924.

FIGS. 10A, 10B, and 10C are diagrams illustrating open 1000, short 1010, and transient 1020 fault models, respectively, according to some embodiments of the disclosure. FIG. 10A shows an open fault model 1000, which is simulated by adding a high resistance resistor 1008 between a first port 1002 and a second port 1004. In one example, the high resistance resistor 1008 has a resistance of 100 megaohms. FIG. 10B shows a short fault model 1010. In one example, a short fault placeholder is a zero-voltage voltage source placed between port A and port B, similar to the fault placeholder shown in FIG. 6A. In another example, a short fault placeholder is simulated by adding a small resistance resistor 1012 between port A and port B. In one example, the small resistance resistor 1012 has a resistance of 1 pico-ohm. FIG. 10C shows a transient fault model 1020, including a voltage source 1022 and first 1024 and second 1026 switches. The first switch 1024 connected the wire between the first 1004 and second 1006 ports. The second switch 1026 connect the voltage source 1022 to the wire between the first 1004 and second 1006 ports. As shown in FIG. 10C, when the first switch 1024 is closed, the second switch 1026 is open. When the when the first switch 1024 is open, the second switch 1026 is closed. The voltage source 1022 can be a VDD source, a VSS source, a stuck-at-zero model, a stuck-at-one model, or it can be a voltage source that generates a pattern of high and low voltages. In various examples, the voltage source 1022 creates a periodic or user-defined sequence of voltages. The voltage source 1022 can be configured to generate any selected type of voltage sequence.

Figure 11:
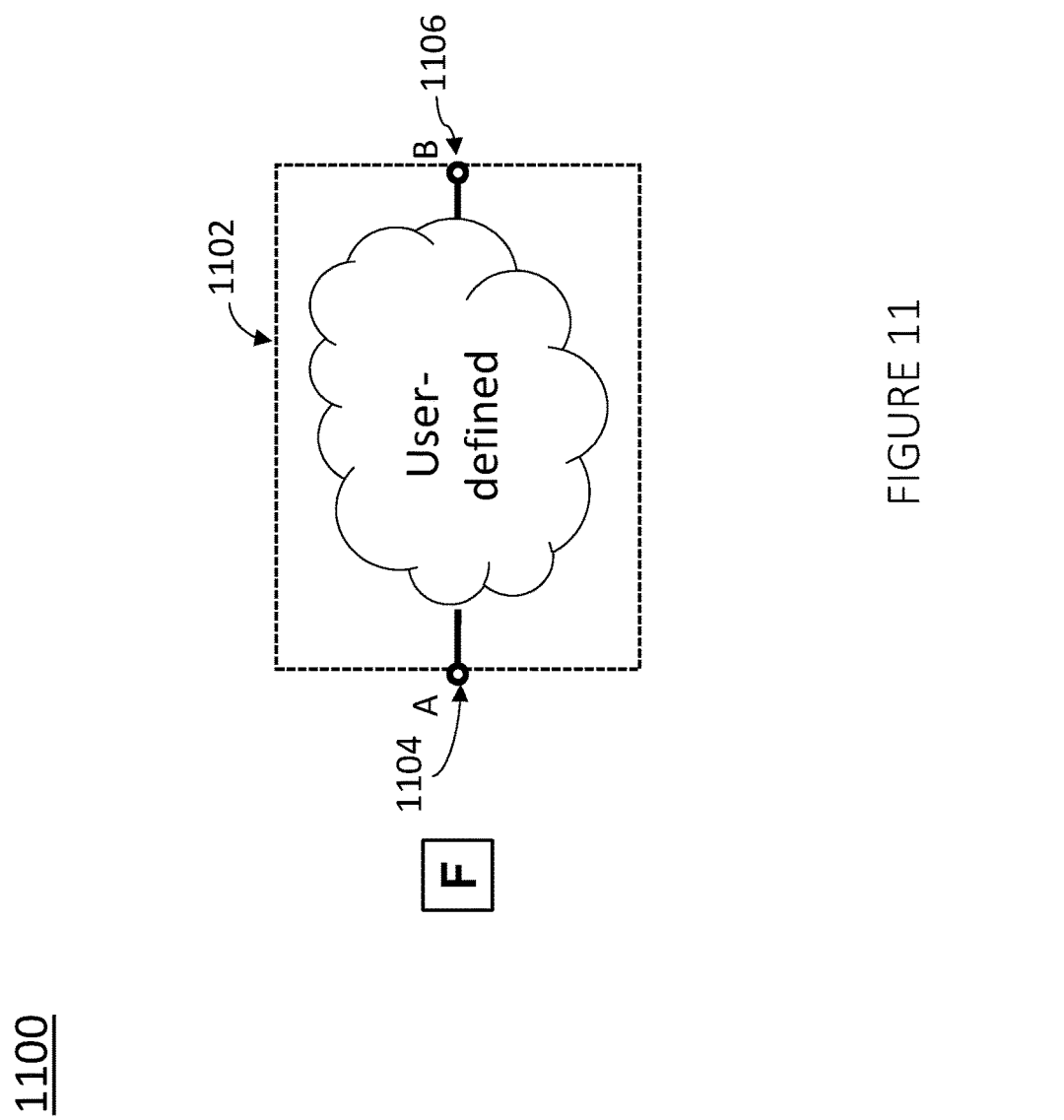
FIG. 11 is a diagram illustrating a custom fault model, according to some embodiments of the disclosure.

FIG. 11 is a diagram 1100 illustrating a custom fault model 1102, according to some embodiments of the disclosure. In particular, user-defined fault models having first 1104 and second 1106 nodes can replace fault placeholders. Thus, complex fault types can be created for inclusion in the automated analog fault detection systems. The systems and methods discussed herein can be used with any circuit design, and custom fault models can vary from simple to complex. Thus, there are many possible custom fault models.

Figure 12C:
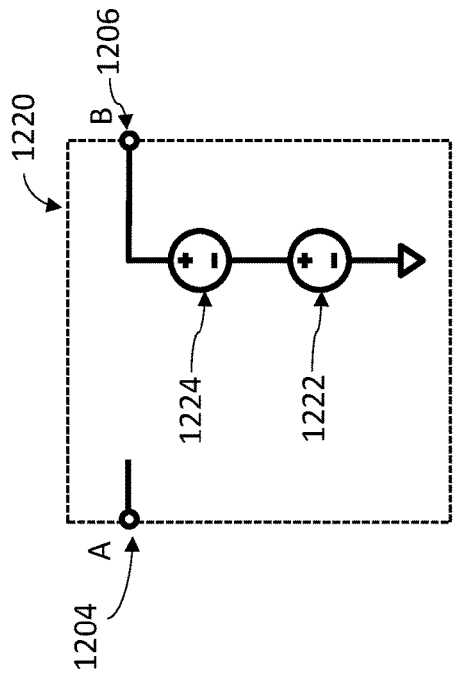
FIGS. 12A-12D are diagrams illustrating custom fault models, according to some embodiments of the disclosure.
Figure 12D:
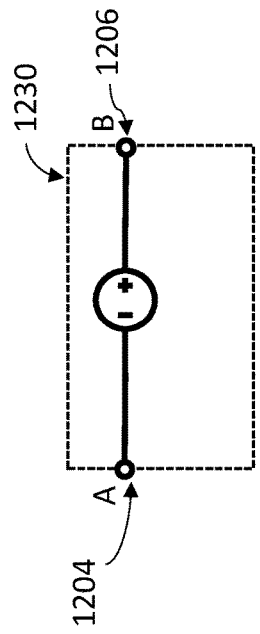
Figure 12A:
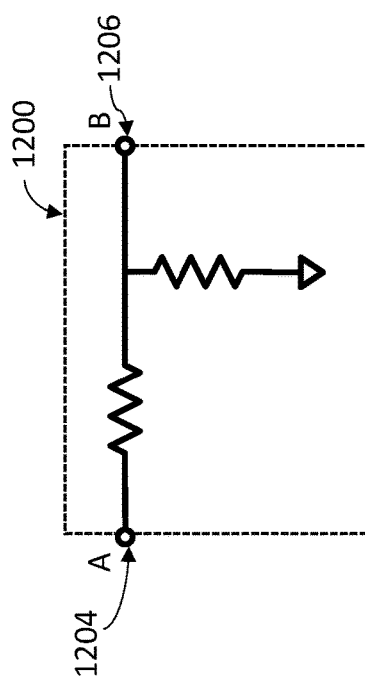

FIGS. 12A-12D show several possible custom fault models, according to some embodiments of the disclosure. FIG. 12A shows an example of a first custom fault model 1200 designed to model reduced signal voltage. In the custom fault model 1200, a resistive voltage divider is placed between the first 1204 and second 1206 nodes to reduce the voltage on the signal at the first node 1204. The resistance values on the resistors can be adjusted to control the amount of change.

Figure 12B:
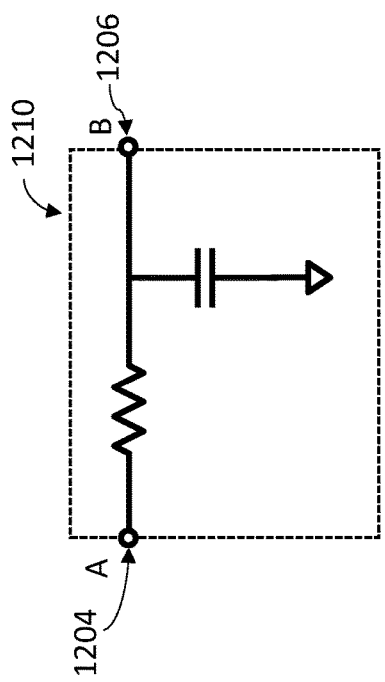

FIG. 12B shows an example of a second custom fault model 1210 designed to model a long wire delay between the first 1204 and second 1206 nodes. The long wire delay includes a resistor between the first 1204 and second 1206 nodes, and a capacitor between a ground and the second node 1206. The effect of the long wire delay is that when the signal at the first node 1204 changes, there is a delay before the signal at the second node 1206 changes. The length of the delay is adjusted depending on the resistance of the resistor and the capacitance of the capacitor.

FIG. 12C shows an example of a third custom fault model 1220 including first 1222 and second 1224 voltage sources connected to the second node 1206. The first voltage source 1222 is a Vdd signal, and the second voltage source 1224 is a random noise signal. Thus, extra random noise is added to the Vdd signal in the custom fault model 1220. In one variation of the custom fault model, extra random noise is added to a stuck low voltage source. In another variation, noise is added to another fault type.

FIG. 12D shows an example of a fourth custom fault model 1230 including a noise source between the first 1204 and second 1206 nodes. The noise source adds noise to signal from the first node 1204 before the signal reaches the second node 1206. In one example, the fourth custom fault model 1230 is used to model interference on the wire between the first 1204 and second 1206 nodes. In other implementations, different circuits are used to model interference.

In another custom fault model, there is a sample and hold circuit between the first 1204 and second 1206 nodes. The sample and hold circuit periodically samples the voltage of the first node 1204 and holds the voltage until the next sample point.

According to various implementations, fault detection includes a Functional Safety Mode and a Testbench Qualification Mode. Functional Safety Mode can be used for detection of faults and to generate unsafe condition messages. User-specific messages can be added in the functional safety mode. In Testbench Qualification Mode, a pass/fail result from the fault detection system determines if a fault is detected.

In some implementations, for fault reporting, fault detection results are stored in an intelligent database, and a fault report is created for user analysis. The fault report includes a list of the tested faults with the detection result for each fault. In some examples, a safe failure fraction is calculated in functional safety mode.

In some implementations, in addition to the functional safety application described above, the method can be used for design verification (DV) qualification of an analog block. DV qualification can be used to analyze the effectiveness of a DV testbench that was used to validate a design block. In this application, the injected faults represent potential bugs in the design and the detection process shows whether or not the bug would be found by the DV testbench. If an injected fault does not result in a testbench failure, then there is a shortcoming in the verification strategy. Similar to fault injection, DV qualification has existing industry solutions for digital designs, but not for analog circuits.

According to some implementations, a method for analog fault injection includes forcing a value at a selected node in a simulation instead of placing fault models in the netlist. In some implementations, the library of models of fault types injected can be limited to selected fault types, and in some implementations, instead of using a library of models, a selected number of fault types can be selected for simulation. In one example, the open and short fault types are selected for simulation.

In some implementations, the fault insertion simulation is continued past the initial diagnostic interval. For example, if the SPI interface is disabled by a fault, the device output does not change. This is recorded as a safe detected fault. However, since a subsequent command to change output then fails, the fault can be considered unsafe. In one example, the fault is provisionally marked as safe, pending a subsequent simulation of a longer diagnostic interval. In another example, the count of safety intervals is recorded.

In some applications, multiple faults are analysed per scenario. Thus, in some implementations, multiple faults are injected into a circuit.

According to various implementations, types of analog circuits which can be fault injected include converters, analog-to-digital converters (ADCs), digital-to-analog converters (DACs), Non-volatile memory, amplifiers, voltage to current output stages, power on resets, oscillators, Low Drop Out (LDO) regulators, comparators, bandgap references, temperature sensors, and fault protection switches. In other implementations, other types of analog circuits are fault injected. Additionally, digital circuits such as digital I/O pads and buck DC-DC converters, can be fault inserted in an analog simulation, with voltages and currents present.

FIG. 13 depicts a block diagram illustrating an exemplary data processing system 1300 that may be used in a computing system for analog fault injection as described herein.

As shown in FIG. 13, the data processing system 1300 may include at least one processor 1302 coupled to memory elements 1304 through a system bus 1306. As such, the data processing system may store program code within memory elements 1304. Further, the processor 1302 may execute the program code accessed from the memory elements 1304 via a system bus 1306. In one aspect, the data processing system may be implemented as a computer that is suitable for storing and/or executing program code. It should be appreciated, however, that the data processing system 1300 may be implemented in the form of any system including a processor and a memory that is capable of performing the functions described within this specification.

The memory elements 1304 may include one or more physical memory devices such as, for example, local memory 1308 and one or more bulk storage devices 1310. The local memory may refer to random access memory or other non-persistent memory device(s) generally used during actual execution of the program code. A bulk storage device may be implemented as a hard drive or other persistent data storage device. The processing system 1300 may also include one or more cache memories (not shown) that provide temporary storage of at least some program code in order to reduce the number of times program code must be retrieved from the bulk storage device 1310 during execution.

Input/output (I/O) devices depicted as an input device 1312 and an output device 1314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 13 with a dashed line surrounding the input device 1312 and the output device 1314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 1316 may also be coupled to the data processing system to enable it to become coupled to other systems, computer systems, remote network devices, and/or remote storage devices through intervening private or public networks. The network adapter 1316 may comprise a data receiver for receiving data that is transmitted by said systems, devices and/or networks to the data processing system 1300, and a data transmitter for transmitting data from the data processing system 1300 to said systems, devices and/or networks. Modems, cable modems, and Ethernet cards are examples of different types of network adapter that may be used with the data processing system 1300.

As pictured in FIG. 13, the memory elements 1304 may store an application 1318. In various embodiments, the application 1318 may be stored in the local memory 1308, the one or more bulk storage devices 1310, or apart from the local memory and the bulk storage devices. It should be appreciated that the data processing system 1300 may further execute an operating system (not shown in FIG. 13) that can facilitate execution of the application 1318. The application 1318, being implemented in the form of executable program code, can be executed by the data processing system 1300, e.g., by the processor 1302. Responsive to executing the application, the data processing system 1300 may be configured to perform one or more operations or method steps described herein.

In another aspect, the data processing system 1300 may represent a client data processing system. In that case, the application 1318 may represent a client application that, when executed, configures the data processing system 1300 to perform the various functions described herein with reference to a "client". Examples of a client can include, but are not limited to, a personal computer, a portable computer, a mobile phone, or the like.

Persons skilled in the art will recognize that while the elements 1302-1318 are shown in FIG. 13 as separate elements, in other embodiments their functionality could be implemented in lesser number of individual elements or distributed over a larger number of components.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1302 described herein.

Variations and Implementations

In the discussions of the embodiments above, the capacitors, clocks, DFFs, dividers, inductors, resistors, amplifiers, integrators, switches, digital core, transistors, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, the electrical circuits of the FIGURES may be implemented as stand-alone modules (e.g., a device with associated components and circuitry configured to perform a specific application or function) or implemented as plug-in modules into application specific hardware of electronic devices.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

In certain contexts, the features discussed herein can be applicable to circuits designed for medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that some of the operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Other Notes, Examples, and Implementations

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method for an automated analog fault injection, the method comprising:
   creating a list of fault models for injection to an analog circuit;
   adding a first fault placeholder to the analog circuit;
   running fault simulations by replacing the first fault placeholder with a first analog fault model from the list of fault models; and
   determining whether the first analog fault model is detected.

2. The method of claim 1, further comprising generating a report of detection results.

3. The method of claim 1, further comprising creating a list of fault locations, and adding a second fault placeholder to each fault location on the list of fault locations.

4. The method of claim 1, wherein the creating a list of fault models includes specifying custom fault types.

5. The method of claim 1, further comprising adding a short fault placeholder to the analog circuit, wherein the short fault placeholder is a fault short.

6. The method of claim 1, further comprising adding a plurality of second fault placeholders at subcircuit ports.

7. The method of claim 1, wherein the first fault placeholder is a voltage source having zero volt.

8. A system for an automated analog fault injection, the system comprising:
   a list of fault models for injection to an analog circuit;
   a plurality of fault placeholders for adding to the analog circuit; and
   a processor configured to run fault simulations by replacing ones of the plurality of fault placeholders with a first fault model from the list of fault models, wherein the processor is further configured to determine whether the first fault model is detected.

9. The system of claim 8, wherein the processor is further configured to generate a report of detection results.

10. The system of claim 8, wherein the processor is further configured to create a list of fault locations, and wherein ones of the plurality of fault placeholders are added to each fault location on the list of fault locations.

11. The system of claim 8, wherein the list of fault models includes custom fault types.

12. The system of claim 8, further comprising a short fault placeholder for adding to the analog circuit, wherein the short fault placeholder is an open circuit.

13. The system of claim 8, wherein the plurality of fault placeholders are voltage sources having zero volts.

14. One or more non-transitory computer-readable media with instructions stored thereon, the instructions when executed on a machine, cause the machine to:
   create a list of fault models for injection to an analog circuit;
   add a first fault placeholder to the analog circuit;
   run fault simulations by replacing the first fault placeholder with a first fault model from the list of fault models; and
   determine whether the first fault model is detected.

15. The non-transitory computer-readable media of claim 14, wherein the instructions when executed on a machine, further cause the machine to generate a report of detection results.

16. The non-transitory computer-readable media of claim 14, wherein the instructions when executed on a machine, further cause the machine to create a list of fault locations, and add a second fault placeholder to each fault location on the list of fault locations.

17. The non-transitory computer-readable media of claim 14, wherein the creating a list of fault models includes specifying custom fault types.

18. The non-transitory computer-readable media of claim 14, wherein the instructions when executed on a machine, further cause the machine to add a short fault placeholder to the analog circuit, wherein the short fault placeholder is a fault short.

19. The non-transitory computer-readable media of claim 14, wherein the instructions when executed on a machine, further cause the machine to add a plurality of second fault placeholders at subcircuit ports.

20. The non-transitory computer-readable media of claim 14, wherein the first fault placeholder is a voltage source having zero volt.

* * * * *